United States Patent [19]

Sowig et al.

[11] Patent Number: 5,475,424
[45] Date of Patent: Dec. 12, 1995

[54] CIRCUIT FOR THE CUT OFF REGULATION IN A TELEVISION RECEIVER RENDERED MOMENTARILY OPERATIVE IN RESPONSE TO A PREDETERMINED OPERATING CONDITION

[75] Inventors: Helmut Sowig, VS-Villingen, Germany; David M. Vizer, Enfield, United Kingdom

[73] Assignee: Deutsche Thomson-Brandt GmbH, Villingen-Schwenningen, Germany

[21] Appl. No.: 402,752

[22] Filed: Mar. 10, 1995

Related U.S. Application Data

[63] Continuation of Ser. No. 60,684, May 12, 1993, abandoned, and a continuation of Ser. No. 892,899, May 29, 1992, abandoned, and a continuation of PCT/EP90/01923 filed Oct. 27, 1990.

[30] Foreign Application Priority Data

Nov. 3, 1989 [DE] Germany ................................. 3936584

[51] Int. Cl.⁶ ..................................... H04N 17/04
[52] U.S. Cl. ................................. 348/177; 348/181
[58] Field of Search ..................... 348/177, 178, 348/181, 189, 191; 358/243, 74, 139, 10; H04N 5/68, 9/16, 17/00, 17/02, 17/04

[56] References Cited

U.S. PATENT DOCUMENTS

| | | | |
|---|---|---|---|
| 4,260,882 | 4/1980 | Janssen | 358/74 |
| 4,340,904 | 7/1982 | Winwrove | 358/29 |
| 4,340,964 | 7/1982 | Wingrove | 358/10 |
| 4,370,674 | 1/1983 | Johnson et al. | 358/74 |
| 4,450,476 | 5/1984 | Tallant | 358/74 |
| 4,456,476 | 5/1984 | Tallant | 358/74 |
| 4,516,152 | 5/1985 | Willis | 358/74 |
| 4,562,479 | 12/1985 | McDonald | 358/243 |
| 4,599,643 | 7/1986 | Harlan | 358/74 |
| 4,633,321 | 12/1986 | Tallant | 358/243 |
| 4,692,793 | 9/1987 | Tamura | 358/74 |
| 4,694,350 | 9/1987 | Hinn | 358/242 |
| 4,723,167 | 2/1988 | Griffey | 358/243 |
| 4,891,700 | 1/1990 | Meunier | 358/243 |

FOREIGN PATENT DOCUMENTS 0309726  8/1988  European Pat. Off. .
62-34489 2/1987  Japan .

OTHER PUBLICATIONS

IBM Technical Bulletin vol. 29 No. 9, Feb. 1987.
Research Disclosure, No. 285, Jan. 29, '88, (New York, N.Y., US) "Automatic non-optical beam current balance for multiple beam cathode ray tube", p. 55.
Patent Abstracts Of Japan 62–34489 Feb. 14, 1987.

*Primary Examiner*—James J. Groody
*Assistant Examiner*—Chris Grant
*Attorney, Agent, or Firm*—Joseph S. Tripoli; Peter M. Emanuel; Robert D. Shedd

[57] ABSTRACT

A circuit for automatically adjusting the beam current of a CRT to compensate for long term changes in the characteristics of the CRT upon the occurrence of an operational event of the CRT, and for avoiding producing unwanted lines in dark screen areas during current blanking includes an adjustment circuit for providing a reference control signal. A test line generator provides a test line pulse to the adjustment circuit upon the occurrence of the operational event. The beam current developed by the reference control signal is measured and an adjustment voltage is generated. A comparator receives the adjustment voltage and a reference voltage and provides a control voltage. A switch connects the test line generator and the control voltage to the adjustment circuit a preselected time after the occurrence of the operational event. A memory device stores the control voltage until the next occurrence of the operational event.

8 Claims, 2 Drawing Sheets

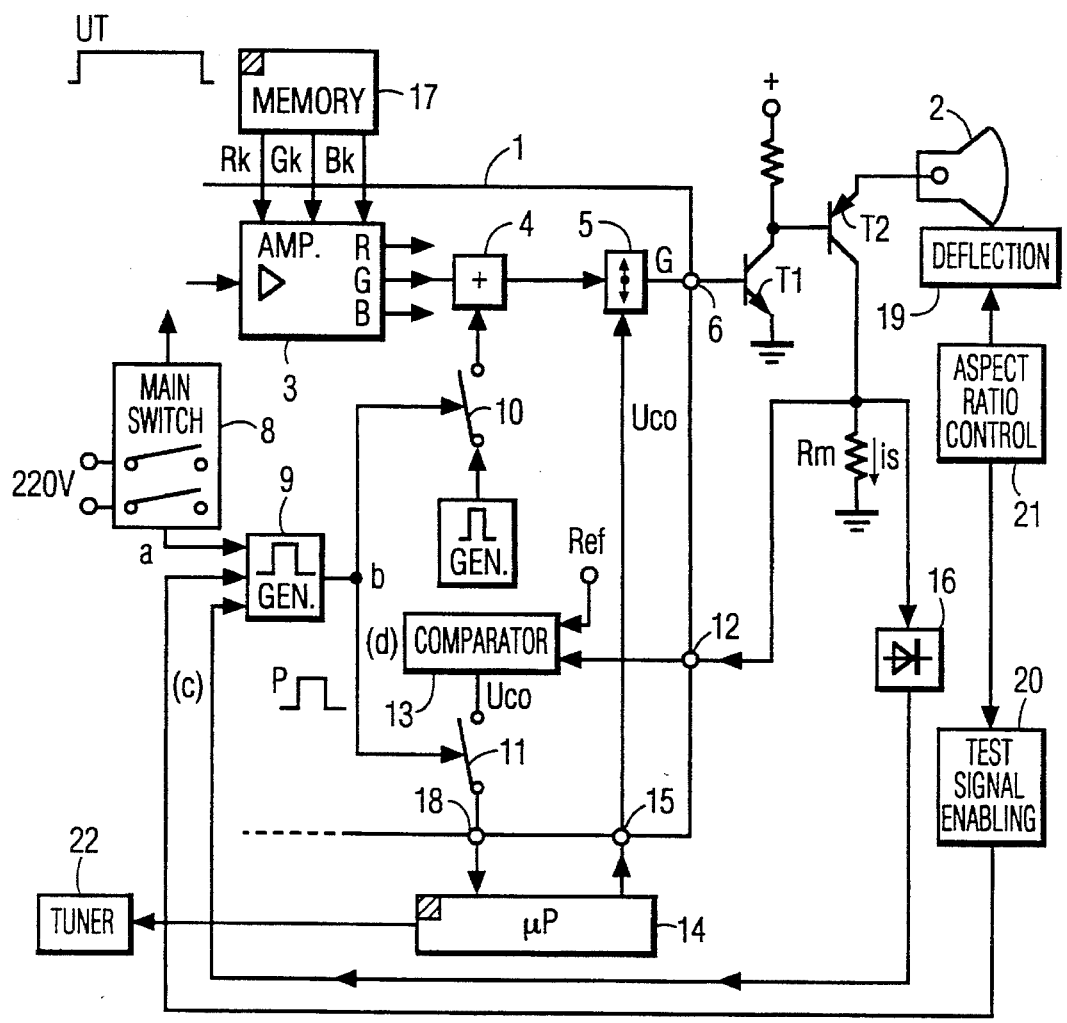
FIG. 1
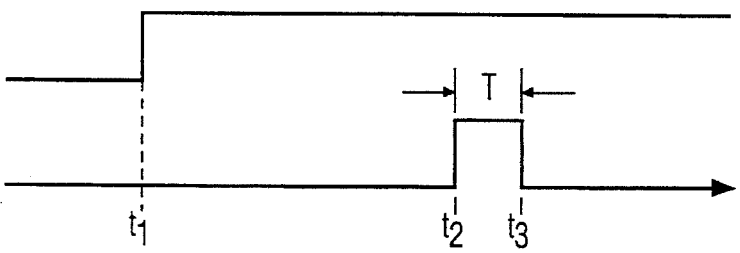
FIG. 2a
FIG. 2b
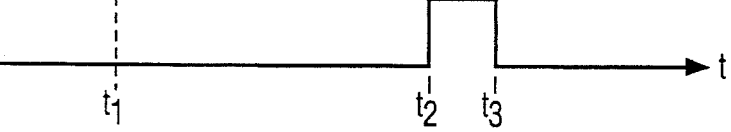
FIG. 2c
FIG. 2d
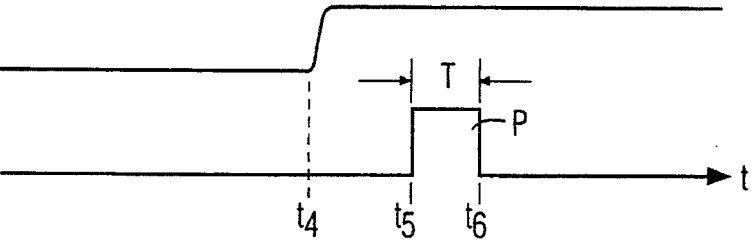

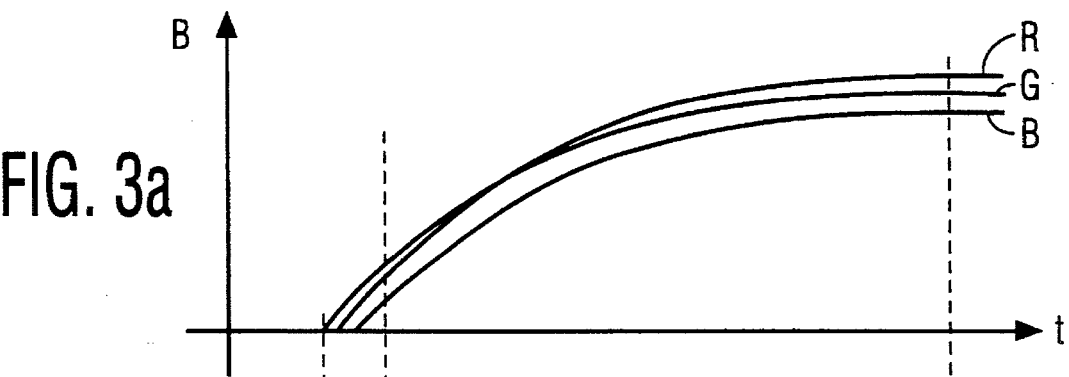
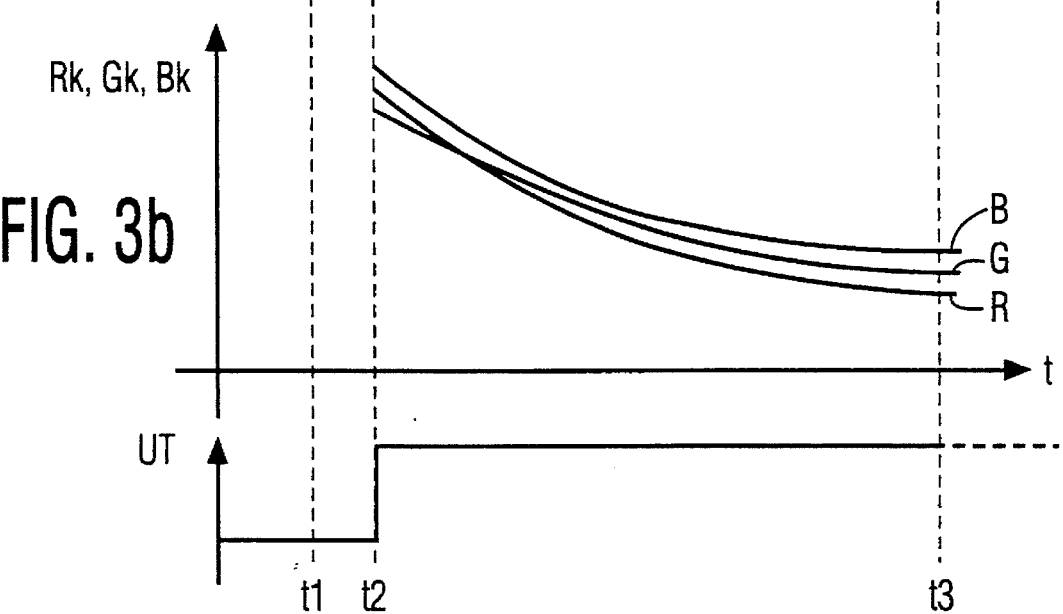

CIRCUIT FOR THE CUT OFF REGULATION IN A TELEVISION RECEIVER RENDERED MOMENTARILY OPERATIVE IN RESPONSE TO A PREDETERMINED OPERATING CONDITION

This is a continuation of application Ser. No. 08/060,684, filed May 12, 1993, now abandoned and a continuation of application Ser. No. 07/892,899, filed May 29, 1992, now abandoned.

This is a continuation of PCT application PCT/EP 90/01923 filed Oct. 27, 1990 by Helmut Sowig and David Michael Vizer and titled "Circuit For The Cut Off Regulation In A Television Receiver".

This invention is directed to a circuit for regulating the beam current in a television receiver, such regulation is also generally referred to as cutoff regulation. In a television receiver reference signals for a picture half-tone (gray scale value) are inserted during the empty lines of the vertical blanking interval. Corrective variables for correcting the beam current are obtained by evaluating the generated beam currents for R, G, B. These reference signals are not visible on the screen because the electron-beam is located outside the picture field during the empty line times. However, when a picture having a 16:9 aspect ratio is scanned onto a screen having a 4:3 aspect ratio black bands are created at the upper and lower picture edges. Accordingly, when the electron-beam scans the actual picture having the 16:9 aspect ratio the reference signal is outside the written picture area but is within the screen during the scanning of the black bands. The reference signal outside the actual picture is visible within the bands, which are supposed to be black.

The invention is predicated upon the fact that the beam current measurement using a defined reference signal is necessary in order to tune-in the blocking point of the picture tube so that the beginning of the beam current occurs at the black level of the video signal. However, a permanent repeated measurement, for example, during every vertical blanking period, is not necessary. It is sufficient to make the measurement only occasionally because the value of the current changes over a very long time. Accordingly, it is sufficient to make the measurement each time the television receiver is turned on or off or at some other point in time which occurs infrequently. After each measurement, the correct value for the correction of the blocking point is stored in a permanent memory. The correction variable can then be used unaltered over a long period of time, for example days, weeks or months, without renewed measurement.

It is possible to alter the vertical deflection such that the electron-beam is initially located outside the screen and then, at the start of the actual picture, to discontinuously deflect the beam to the corresponding position to start the picture. However, such an alteration of the vertical deflection requires complex circuitry and is technically difficult and therefore is not practicable.

It is the object of the invention to modify the cut off current regulation circuit so that the reference signals are not visible on the screen without impairing the function of the circuit and without changing the vertical deflection.

In "Research Disclosure", no 28577, page 55, January 1988 a method for beam current cut off regulation is described wherein the beam is driven off the nominal path in order to strike a sense element. A suitable drive signal is applied to the test beam so that the beam current characteristic can be determined. This system does not make a measurement by comparing the voltage drop across measuring resistors through which the beam current flows and comparing it with a reference voltage. Also, there is no suggestion of detecting an infrequent event and providing the reference signal shortly after such an event.

U.S. Pat. No. 4,450,476 shows an automatic kinescope bias (AKB) control system for a television receiver wherein unwanted transient effects caused by AKB action before the kinescope electron guns reach normal operating temperature are prevented by delaying the initial operation of the AKB system for a time sufficient to allow the electron guns to reach proper operating temperature.

EP-A 0 309 726 shows a circuit for inserting tests lines for automatically adjusting the beam currents within a cathode my tube. In order to reduce the visibility of the test lines in case the vertical deflection amplitude is reduced, the test lines are inserted during the visible picture forward period during the first line of successive fields. The test lines are inserted in dependence from a fixed minimal value of the mean beam current of the picture tube.

With the invention the disturbing reference signal does not need to be inserted into the video signal during most of the time the television receiver is operating and the interference typically caused on the screen by the reference signal is avoided.

In the FIGURES:

FIG. 1 is a preferred embodiment.

FIGS. 2a, 2b, 2c and 2d show curves illustrating the operation of the preferred embodiment of FIG. 1.

FIGS. 3a and 3b show correction values used to correct beam current during the warmup period.

FIG. 1 shows the video processor 1 which supplies the red, green and blue (R,G,B) control signals for the three beam currents of a picture tube 2. For simplicity, only the circuit for color signal G is shown; however, a similar circuit is also provided for the two other color signals R,B. The color signal G is provided by an amplifier 3 via an adding stage 4 to an adjustment circuit 5. In the adjustment circuit 5, the direct voltage position of the signal and thus the beam current for a particular signal value can be adjusted by an applied control voltage Uco. The regulated signal is available on output terminal 6 which is connected to the base of a video final stage transistor T1. A measuring transistor T2 is connected to the cathode of the picture tube 2. The beam current 'is' from the picture tube 2 flows through a measuring resistor Rm.

The control voltage Uco causes the beam current 'is' for a predetermined value of the signal G, for example the black level or a defined value between black and white, to have a value determined by a reference voltage. In particular, for the black value the beam current should lie on the beam current starting point, referred to as the cutoff point.

A test line generator 7 generates a reference control signal for the G signal in defined lines during the vertical blanking interval. Immediately after the television receiver is turned on with the main switch 8, a voltage shown FIG. 2a, is available at the output terminal of the main switch 8. This voltage is applied to the pulse generator 9. After a delay from t1 to t2, the generator 9 generates a keying pulse P, at time t2 and having a duration T. The time from t1 to t2 is selected to be sufficiently long to ensure that the beam current 'is' has reached its definitive value. The pulse P closes the switch 10 and the reference control signals generated by the generator 7 are applied to the adding stage 4, where they are added to the color signal G. A voltage, which is proportional to the beam current 'is' is developed across the measuring resistor Rm. This voltage is available on the input terminal 12 of the video processor 1 and is applied to a comparator circuit 13 in which it is compared to a reference voltage Ref. The control voltage Uco results from the comparison and represents the deviation of the beam current 'is' from that of the reference control signal. The switch 11 is also closed by the pulse P and the voltage Uco is applied to the output terminal 18 of the video processor 1. Terminal 18 is connected to the memory 14, which preferably is a microprocessor. The control voltage Uco and the corresponding voltages for the two other color signals R, B are stored in the memory 14. The time interval for measuring control voltage Uco ends at time t3, and the switches 10, 11 are reopened. The voltage Uco is applied by the terminal 15 to the adjustment circuit 5 and causes the color signal to change in such a manner that the proper beam current 'is' is generated. The voltage Uco is, in practice, a slowly changing voltage because it only serves to balance changes of the beam current based on aging and other long term tolerance changes.

Each time the television receiver is turned on, the voltage Uco is generated and stored in the memory 14, replacing the previous value and applied to the adjustment circuit 5. The actual measuring process lasts only for the duration of the pulse P, which is a very short period of a few ms. Accordingly, during almost the entire operating time of the television receiver, control voltage Uco is a stored value, rather than a measured value. Therefore, even if the lines of the vertical blanking interval lie within the visible picture area, the reference control signal can not become visible on the screen because the voltage is disconnected from the adding stage by means of the switch 10.

In an alternative technique for initiating the short-time measurement of the beam current, the beam current 'is' is evaluated in a beam current detector 16. The detector 16 supplies a voltage shown in FIG. 2c, which represents the beginning of the beam current. In FIG. 2c, the beam current starts at time t4. After a short time from t4 to t5 of a few seconds, the pulse P is generated in circuit 9. This pulse operates the switches 10, 11 in the manner described for the initiation of the measuring process for generating Uco. The time from t4 to t5 is to make sure that the beam current has reached its definitive value after its start at time t4. The pulses P shown in FIG. 2b and FIG. 2d can have the same position in time.

The two alternative criteria for initiating the measuring process, are the switching on of the television receiver and the start of the beam current. These criteria can be evaluated in the additive sense of an AND-function. The circuit would then be designed so that the pulse P is generated when the television receiver is switched on, the voltage according to FIG. 2a is present and the beginning of the beam current based on the voltage according to FIG. 2c has been sensed. Preferably, a filter section which effects an integration of the voltage gained over several fields is located behind the current detector circuit 16.

When the lines of the vertical blanking time, in which the reference control signals are generally located, lie within the visible picture area, the reference control signals are momentarily visible on the screen. Initially, this is unavoidable because a beam current must flow in order to develop the control voltage Uco and the beam current necessarily causes a brightening of the picture. However, this visibility on the screen is so brief and moreover, lies within the switch-on phase of the receiver so that it does not appear disturbing.

The residual visibility of the reference control signals can be eliminated by the following measures. Let it be assumed that the television receiver basically works with a vertical deflection set by a deflection unit 19, the picture tube has a 4:3 aspect ratio, and the test lines therefore do not become visible in the picture area. Under these conditions when a signal with a 16:9 aspect ratio is received the test lines become visible above the actual picture. Therefore, upon reception of a signal with a 16:9 aspect ratio, the amplitude of the vertical deflection initially remains in the attitude for the 4:3 aspect ratio and the test signal is generated under the control of a test signal enabling unit 20 coupled to an aspect ratio control unit 21. The electron-beam is then located outside the visible picture area and is not visible during the vertical blanking interval. The inverting measuring process for determining the control voltage Uco takes place in this condition so that the electron-beams generated at that time are not visible on the screen. The changeover of the vertical deflection to the 16:9 format occurs under the control of aspect ratio control unit 21 after the conclusion of the measuring process, i.e. after the times t3, t6 in FIGS. 2b and 2d. The electron-beam is then located on the visible screen area but outside of the picture area during the vertical blanking period. However, the measuring process has been completed, the reference control signals are no longer applied to the adding stage 4, and no disturbing brightening of the screen occurs.

Because of an overlarge vertical deflection amplitude with these measures a considerable geometric distortion can result. A circle would be deformed into a vertically standing oval. In order to avoid such a geometrically distorted picture, it is practical to blank the picture contents during this time.

If the measurement is made each time the television receiver is turned on, the correction values are determined for the cold picture tube. The measured values probably would not be valid for a warm picture tube in steady-state operating condition. Therefore, it may be advantageous to make the described measurement after the picture tube has reached its steady-state operating temperature. For example, the measurement can be made when the receiver is turned off, during the transition to the standby mode, with each new channel selection by a tuner 22, or automatically in long preselected time intervals.

Another possibility consists of making a measurement when the full height of the screen is written on with a visible picture. At this time, the electron-beam is located outside the visible screen area during the measurement periods. For example, it can be automatically recognized in a television receiver whether a first operating mode having 4:3 aspect ratio and a full height image is present or whether a second operating mode having a 16:9 aspect ratio a reduced picture height is present. A detector is provided to recognize the 4:3 aspect ratio operating mode and to trigger a measurement during the vertical blanking time. This operation is possible because the reference control signals do not become visible. The measurement results obtained during this first operating mode are stored and are available during the second operating mode in which measurement is no longer possible without interference on the screen. The memory is updated during the first operating mode with 4:3 aspect ratio picture reproduction.

If the measurement is made while the tube is warming-up, requiring approximately 15 minutes will television receiver is turned on, the stored correction values after the not be valid.

For example, the tube would reproduce the desired white balance at the operating temperature in the steady-state operating condition. However, the white balance would be adulterated during the 15 minute warm-up period. This disadvantage can be eliminated by determining the correction values required during the warm-up phase of the picture tube and using their values to secure the correct white balance during warmup. The warm-up correction values are stored in a memory and applied to the picture tube during the heat-up phase each time the receiver is turned on.

This solution is illustrated in FIG. 3. The television receiver is switched on at time t1. FIG. 3a shows the course of brightness of the colors R, G, B displayed on the screen. It can be seen that the picture tube shows a deviation in the brightness during this heat-up phase. For example, in FIG. 3a red is too light and blue too dark during the second half of the heat-up phase.

Correction values shown in FIG. 3b are stored in a memory, and become active at time t2 after a brief blanking time of the picture tube. The course of these correction values Rk, Gk, Bk is the inverse of the curves in FIG. 3a and eliminate the deviation in the curves according to FIG. 3a. For example, according to FIG. 3a, the reproduction of R is too light at time t3. Hence, the correction voltage Rk according to FIG. 3b is correspondingly lowered and so compensates the increased brightness according to FIG. 3a. The shown deviations in the brightness courses for R, G, B according to FIG. 3a are consequently compensated by the corresponding control voltages Rk, Gk, Bk according to FIG. 3b applied at the picture tubes during the heat-up phase of the picture tubes.

In FIG. 1, the values Rk, Gk, Bk are already stored in the memory 17 during the manufacture of the receiver. The memory 17 is preferably constructed as a programmable constant value storage in the form of an EPROM or ROM. The memory 17 is activated during the heat-up phase by the keying impulse UT. It then delivers the correction values Rk, Gk, Bk. These are added to the signals R, G, B in the amplifier in such a way that the compensation according to FIG. 3 is caused at the picture tube.

We claim:

1. In a television system, apparatus comprising:

a source of a video signal;

a picture tube;

an amplifier having an input at which said video signal is received and an output at which an amplified version of said video signal is produced and which is coupled to said picture tube;

means for coupling a test signal to said amplifier when enabled to do so;

means for sensing the beam current flowing in said picture tube when said test signal is enabled;

means responsive to said sensed beam current for generating adjustment signal;

means for storing said adjustment signal;

means for coupling said stored adjustment signal to said amplifier;

means for detecting the occurrence of a predetermined control function of said television system which occurs infrequently within the total operating time of said television system;

means coupled to said detecting means for enabling said test signal coupling means to couple said test signal to said amplifier momentarily for a short time interval in comparison to the total operating time of said television system in response to the detection of the occurrence of said predetermined control function, and for thereafter disabling said test signal coupling means from coupling said test signal to said amplifier except during said short time interval after the detection of the next occurrence of said predetermined control function.

2. The apparatus recited in claim 1, wherein:

said television system includes means for turning said television system "on" and "off"; and said predetermined control function is turning the television system "on".

3. The apparatus recited in claim 2, wherein:

said short time interval is delayed from the time at which said television system turned "on" by a time delay which is sufficiently long to allow said picture tube to reach a stable operating temperature after said television system is turned "on".

4. In a television system, apparatus comprising:

a source of a video signal;

a picture tube;

an amplifier having an input at which said video signal is received and an output at which an amplified version of said video signal is produced and which is coupled to said picture tube;

means for coupling a test signal to said amplifier when enabled to do so;

means for sensing the beam current flowing in said picture tube when said test signal is enabled;

means responsive to said sensed beam current for generating adjustment signal;

means for storing said adjustment signal;

means for coupling said stored adjustment signal to said amplifier;

means for changing the aspect ratio of an image produced by said cathode ray tube from one having a full height to one having less than said full height; and means coupled to said aspect ratio changing means for enabling said test signal coupling means to couple said test signal to said amplifier momentarily for a short time interval in comparison to the total operating time of said television system when said aspect ratio is changed from the aspect ratio with the full height to the aspect ratio with less than the full height, and for thereafter disabling said test signal coupling means from coupling said test signal to said amplifier except during said short time interval when said aspect ratio is next changed from the aspect ratio with the full height to the aspect ratio with less than the full height again;

said means for changing the aspect ratio initially maintaining the aspect ratio with the full height for said short time interval when the aspect ratio is changed from the aspect ratio with the full height to the aspect ratio with less than the full height.

5. In a television system, apparatus comprising:

a source of a video signal;

a picture tube;

an amplifier having an input at which said video signal is received and an output fit which fin amplified version of said video signal is produced and which is coupled to said picture tube;

means for coupling a test signal to said amplifier when enabled to do so;

means for sensing the beam current flowing in said picture tube when said test signal is enabled;

means responsive to said sensed beam current for generating adjustment signal;

a first means for storing said adjustment signal;

means for coupling said stored adjustment signal to said amplifier;

means for turning said television system "on" and "off";

means for detecting when said television system is turned "on";

means coupled to said detecting means for enabling said test signal coupling means to couple said test signal to said amplifier momentarily for a short time interval in comparison to the total operating time of said television system when said television system is turned "on", and for thereafter disabling said test signal coupling means from coupling said test signal to said amplifier except during said short time interval when said television system is next turned "on" again; and a second means for storing a compensation signal for modifying said video signal during a warm-up interval after said television system is turned "on" and before said picture tube reaches a stable operating temperature.

6. In a television system, apparatus comprising:

a source or a video signal;

a picture tube;

an amplifier having an input at which said video signal is received and an output at which an amplified version of said video signal is produced and which is coupled to said picture tube;

means for coupling a test signal to said amplifier when enabled to do so;

means for sensing the beam current flowing in said picture tube when said test signal is enabled;

means responsive to said sensed beam current for generating adjustment signal;

means for storing said adjustment signal;

means for coupling said stored adjustment signal to said amplifier;

means for turning said television system "on" and "off";

means for detecting when said television system is turned "off"; and means coupled to said detecting means for enabling said test signal coupling means to couple said test signal to said amplifier momentarily for a short time interval in comparison to the total operating time of said television system after said television system is turned "off", and for thereafter disabling said test signal coupling means from coupling said test signal to said amplifier except during said short time interval after said television system is next turned "off" again.

7. In a television system, apparatus comprising:

a source of a video signal;

a picture tube:

an amplifier having an input at which said video signal is received and an output at which an amplified version of said video signal is produced and which is coupled to said picture tube;

means for coupling a test signal to said amplifier when enabled to do so;

means for sensing the beam current flowing in said picture tube when said test signal is enabled;

means responsive to said sensed beam current for generating adjustment signal;

means for storing said adjustment signal;

means for coupling said stored adjustment signal to said amplifier;

means for tuning said television system to different channels; and means for enabling said test signal coupling means to couple said test signal to said amplifier momentarily for a short time interval in comparison to the total operating time of said television system when the channel to which said television system is tuned is changed, and for thereafter disabling said test signal coupling means from coupling said test signal to said amplifier except during said short time interval after the channel to which said television system is tuned is changed again.

8. In a television system, apparatus comprising:

a source of a video signal;

a picture tube;

an amplifier having an input at which said video signal is received and an output at which an amplified version of said video signal is produced and which is coupled to said picture tube;

means for coupling a test signal to said amplifier during vertical blanking intervals of said video signal when enabled to do so;

means for sensing the beam current flowing in said picture tube when said test signal is enabled;

means responsive to said sensed beam current for generating adjustment signal;

means for storing said adjustment signal;

means for coupling said stored adjustment signal to said amplifier;

said television system includes means for changing the aspect ratio of an image produced by said cathode ray tube; and means for enabling said test signal coupling means to couple said test signal to said amplifier momentarily for a short time interval in comparison to the total operating time of said television system when the aspect ratio of an image produced by said cathode ray tube is changed, and for thereafter disabling said test signal coupling means from coupling said test signal to said amplifier except during said short time interval after the aspect ratio of an image produced by said cathode ray tube is changed again.

* * * * *